United States Patent [19]
Colbaugh et al.

[11] Patent Number: 6,052,050
[45] Date of Patent: Apr. 18, 2000

[54] TWO-WIRE SIGNAL TRANSMITTER AND METHOD FOR MAINTAINING INTEGRITY OF ELECTRICAL CONTACTS

[75] Inventors: Michael E. Colbaugh, Penn Township, West Moreland County; Benjamin A. Giovannelli, Export; Dick J. Kolkman, Hampton Township, Allegheny County, all of Pa.

[73] Assignee: Union Switch & Signal Inc., Pittsburgh, Pa.

[21] Appl. No.: 09/023,902

[22] Filed: Feb. 13, 1998

[51] Int. Cl.$^7$ .................................... H04M 11/04
[52] U.S. Cl. ............... 340/310.01; 340/310.06; 324/527; 324/544; 324/551
[58] Field of Search ............... 340/310.01, 310.06; 324/551, 544, 527, 536

[56] References Cited

U.S. PATENT DOCUMENTS

| 4,528,611 | 7/1985 | Udren | 361/81 |
| 5,612,624 | 3/1997 | Clinton | 324/551 |
| 5,657,324 | 8/1997 | Itkin | 370/276 |

Primary Examiner—Daryl Pope
Attorney, Agent, or Firm—David V. Radack; Kirk D. Houser; Eckert Seamans Cherin & Mellot, LLC

[57] ABSTRACT

Two-wire signal transmitter and method in which a very low-level Alternating Circuit (AC) input signal sensed at a remote circuit at a first end of a signal path is added to a low-level Direct Current (DC) bias signal provided by a local circuit that is located at a second end of the signal path. In a preferred embodiment, the remote circuit is electrically coupled to and powered by the local circuit through a two-wire path interconnection, typically a shielded twisted-pair cable. The DC bias signal has sufficient level to overcome minimum ratings of electrical contacts, thereby to pass the sensed very low-level AC input signal reliably through the poor electrical contacts that are used, for instance, for connecting electronic circuits that run the length of a railway train. In a preferred embodiment, the use of a unity gain current amplifier as a part of the remote circuit reduces the signal degrading effects of long signal paths, but does not amplify the AC input signal, thereby retaining known predetermined railroad vitality requirements. An output signal is provided that is an AC coupled, isolated, non-amplified representation of the AC input signal. An alternate preferred embodiment utilizes no active amplifier as a part of the remote circuit, thereby providing a signal transmitter and method that is less complex, has lower cost, requires smaller packaging, and has somewhat better long-term reliability than the preferred embodiment utilizing the active amplifier in the remote circuit.

13 Claims, 2 Drawing Sheets

TWO-WIRE SIGNAL TRANSMITTER AND METHOD FOR MAINTAINING INTEGRITY OF ELECTRICAL CONTACTS

BACKGROUND OF THE INVENTION

1. Field of the Invention

The present invention relates generally to transmitting very low-level signals to through a set of electrical contacts and, more particularly, to utilizing a two-wire signal transmitter circuit to add a very low-level alternating current (AC) signal to a low-level Direct Current (DC) bias that is of sufficient level to overcome minimum ratings of poor electrical contacts, and further, with the use of a unity gain current amplifier, to reduce the signal degrading effects of long signal paths.

2. Description of the Related Art

As is well known in the art, electrical contacts that degrade over long time periods are sometimes utilized, for functional and economic reasons, to control applications such as train control and protection. These poor electrical contacts present a challenge to the application engineer who must transmit very low level but critical sensor signals through such contacts. In particular, in the case of Automatic Train Coupler contacts that are used for connecting circuits that run the length of a train, signal degradation often may be caused by: poor contacts that require higher minimum contact ratings; a plurality of contacts through which the signal must pass; degradation of the contacts themselves; and the significant lengths of wire that often interconnect the contacts. The poor contacts mentioned are of the type that have minimum contact ratings typically requiring the signals that pass through them to have amplitude levels of at least twelve (12) volts and current levels of at least 0.01 amperes. However, some sensor signals that have levels measuring approximately $\frac{1}{1000}$ of each of those minimum contact ratings must be passed through the poor electrical contacts.

Consequently, particular to train control and similar applications, a need has been felt for providing an improved signal transmitter and method which overcomes the signal degrading effects of poor contacts and very long signal transmission paths that may be associated with those poor contacts.

SUMMARY OF THE INVENTION

It is therefore an object of the present invention to provide an improved signal transmitter and method for passing very low-level sensor signals over poor electrical contacts despite the significantly higher minimum voltage and current contact ratings of the electrical contact.

It is a feature of the present invention to provide an improved two-wire signal transmitter for poor electrical contacts that utilizes two interconnected electronic circuits to add the very low level signal to a low-level DC signal bias that is of sufficient level to overcome the minimum voltage and current ratings of poor electrical contacts.

Briefly described according to one embodiment of the present invention, a signal transmitter is provided for transmitting an alternating current (AC) signal through an electrical contact, wherein the electrical contact has a minimum voltage rating and a minimum current rating that respectively exceeds a voltage level and a current level of the AC signal, the signal transmitter comprising: remote circuit means for sensing the AC signal; a direct current (DC) power source; local circuit means for biasing the AC signal with the DC power source; interconnection means having solely two conductive paths for electrically interconnecting the remote circuit means with the local circuit means; wherein the DC power source provides a DC signal bias that is added to the sensed AC signal at the remote circuit means, thereby to exceed the minimum voltage and current rating of the electrical contact; and wherein the DC signal bias is removed from the sensed AC signal at the local circuit means after being transmitted through the electrical contact via the interconnection means.

In accordance with a preferred embodiment, an electronic circuit at each end of the signal path may be used. A remote circuit may be placed at a remote signal generation location, and a local circuit may be placed at a location where the signal may be needed for processing/control purposes. The remote and local circuits may be electrically coupled with a two-path interconnection that typically may be a shielded twisted-pair cable. The transmitter and method of the present invention may require only two (2) conductive paths between the locations, and the remote circuit may be powered through these same two conductive paths by a power supply that is preferably located in the proximity of the local circuit so that a remote power supply is not needed. Alternately, the power supply may be located within the remote circuit or within the conductive paths, if desired.

A very low-level AC input signal may be sensed by the remote circuit and subsequently added to a low-level DC bias signal that is provided by the local circuit, thereby to provide a biased combination signal. The low-level DC bias signal may be of sufficient level to overcome the poor electrical contact minimum ratings. Moreover, an active unity gain current amplifier may be utilized as part of the remote circuit in order to reduce the signal degrading effects of long signal paths. The active unity gain current amplifier does not amplify the AC input signal, thereby to retain pre-determined railway vitality requirements, as is known in the art. The utilization of the active amplifier as part of the remote circuit provides for the use of in applications where the interconnecting cable introduces wide variations of voltage drop and impedance characteristics.

The biased combination signal may be passed through the poor electrical contacts and the shielded twisted-pair cable to the local circuit, where the low-level DC bias signal subsequently may be removed so that the very low-level AC input signal may be transmitted as a very low-level AC output signal. The output signal is an AC coupled, isolated, non-amplified representation of the AC input signal.

Another preferred embodiment of the present invention may utilize no active amplifier as a part of the remote circuit. Although this preferred embodiment may not be used in applications where the interconnecting cable introduces wide variations of voltage drop and impedance characteristics, this embodiment is less complex, lower cost, requires smaller packaging, and has somewhat better long-term reliability than the preferred embodiment utilizing an active amplifier as a part of the remote circuit.

An advantage of the two-wire transmitter and method of the present invention is reliable and effective with standard railway coupler contacts and wiring.

Another advantage of the present invention is that both the remote and local circuits may be powered solely from either the remote or local circuit.

Another advantage of the present invention is that a vehicle manufacturer must supply only two sets of coupler contacts between two railway vehicles, thereby minimizing the number and cost of coupler contacts that may be required.

Another advantage of the present invention is that a very low-level and typically Alternating Current (AC) signal may be economically and reliably transmitted through a poor electrical contact.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
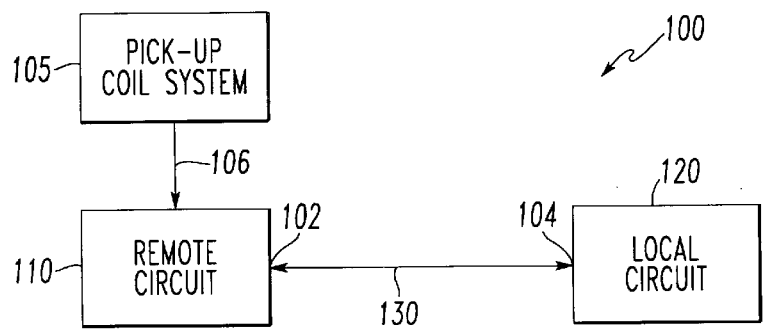
FIG. 1 is a top-level block diagram of the interconnected remote and local circuits of a preferred embodiment of the present invention.

Referring now to FIG. 1, a top-level block diagram is shown of a signal transmitter 100 for transmitting an alternating current (AC) signal (not shown) through electrical contacts 102, 104, wherein the electrical contacts require a minimum voltage as well as a minimum current that respectively exceeds a voltage level and a current level of the AC signal, according to the present invention. As shown, the signal transmitter 100 comprises a pick-up coil system 105 that is electrically interconnected by a conducting path 106 to a remote circuit 110, and a local circuit 120 electrically interconnected by two-wire interconnecting means 130 to the remote circuit 110. The pick-up coil system 105 typically mounts pick-up coils 310, 315 (refer to FIG. 3) to the underside of and in front of a front axle (not shown) of a head locomotive (not shown), thereby to inductively receive track signals that are being transmitted through the rails, as is known in the art. The inductively received track signals are processed by the pick-up coil system 105 on the locomotive for transmission to the remote circuit 110 (refer to FIG. 3).

In a preferred embodiment, the local circuit 120 may be located at local processing equipment (not shown) that needs to make use of an output signal transmitted from a remote sensor (not shown). The remote circuit 1 10 may be located as near as possible to the remote sensor. The remote circuit 110 may even include the remote sensor, shown in FIG. 3 as inductive pick-up coils 310, 315. The two-wire interconnecting means 130 may be a shielded twisted-pair cable, or similar cable, that interconnects the remote circuit 110 and the local circuit 120. The circuits 110, 120 are designed for audio range signals, but it is understood that much higher and lower frequency signals is contemplated within the scope of the present invention.

Figure 2:
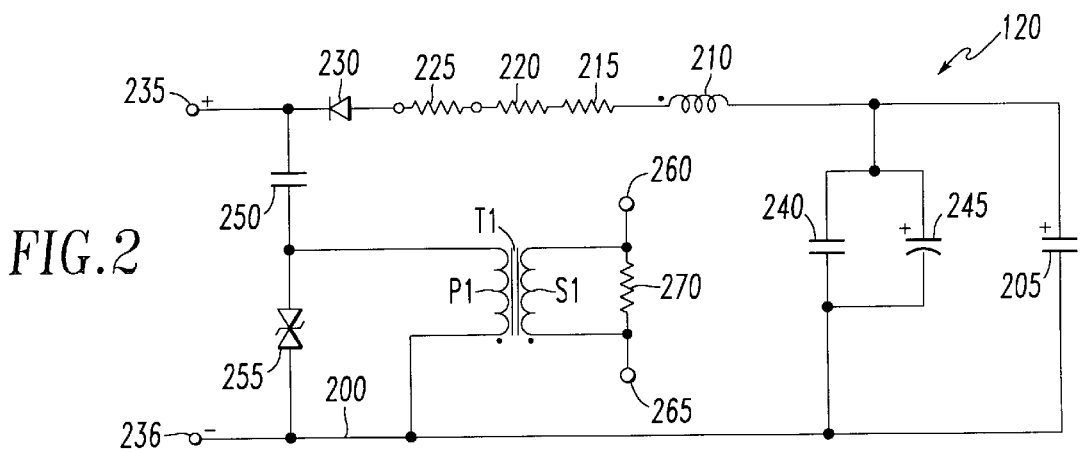
FIG. 2 is a circuit diagram showing a preferred embodiment of the local circuit of the present invention.

FIG. 2 is a circuit diagram showing a preferred embodiment of the local circuit 120 of the present invention. The negative terminal of a direct current (DC) source 205 is electrically coupled to a ground reference, namely a common lead 200. An inductor 210, resistors 215, 220, and 225, and a diode 230 are connected in series between a positive connection lead 235 and the positive terminal of the DC source 205. The negative terminal of the DC source 205 is connected to the common lead 200, which is terminated by a negative connection lead 236. Capacitors 240, 245 are each connected in parallel between the positive terminal of the DC source 205 and the common lead 200. A capacitor 250 is connected between the positive connection lead 235 and the first end of a transzorb 255, while the second end of the transzorb is connected to the common lead 200. The upper end of a primary winding P1 of transformer T1 is connected between the capacitor 250 and the transzorb 255, while the lower end of the primary winding P1 is connected to the common lead 200. The transformer T1 may have a ceramic ferromagnetic Pot core with a 1:1 turns ratio between the primary winding P1 and the secondary winding S1. It will be understood by one skilled in the art that the windings about the core may be bifilar wound, thereby to minimize potentially increased gain in the event of a short, as is known in the art. The upper and lower ends of the secondary winding S1 provide a first output terminal 260 and a second output terminal 265, respectively. FIG. 2 shows a fixed non-inducted load resistor 270 that is connected between the first output terminal 260 and the second output terminal 265. However, in actual operation, the load may be a linear operational amplifier with a gain of 10.

Figure 3:
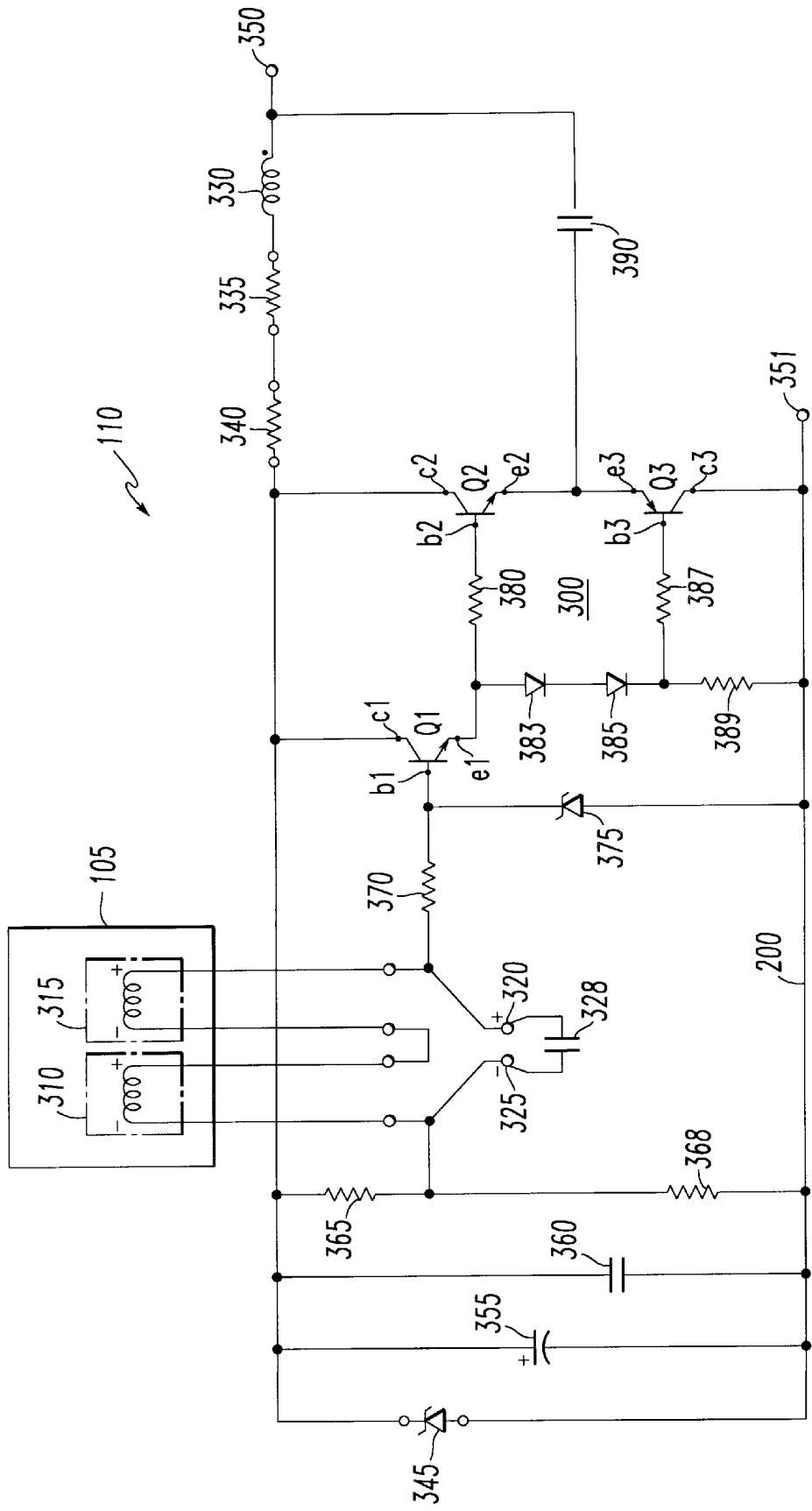
FIG. 3 is a circuit diagram showing a preferred embodiment of the remote circuit with an active unity gain amplifier in accordance with a preferred embodiment of the present invention.

FIG. 3 is a circuit diagram showing a preferred embodiment of the remote circuit 110 with an active unity gain amplifier element 300, including the three transistors Q1, Q2 and Q3, in accordance with a preferred embodiment of the present invention. Inductive pick-up coils 310, 315 are connected in series and provide a positive input lead 320 and a negative input lead 325. A low-pass filter capacitance 328 connected between the positive input lead 320 and the negative input lead 325 filters out interfering high frequencies received from an input signal (not shown) that is sensed by the inductors 310, 315. However, those skilled in the art will recognize that this capacitive filter may not be necessary in certain applications in the field.

An inductor 330, resistors 335, 340, and a Zener diode 345 are connected in series between a positive connection lead 350 and the common lead 200. A negative connection lead 351 terminates the common lead 200. The positive leads of capacitors 355, 360 are each connected to the junction between the resistor 340 and the Zener diode 345, while the negative leads of capacitors 355, 360 are each connected to the common lead 200. The first lead of a resistor 365 is connected to the junction between the resistor 340 and the Zener diode 345, while the second lead of the resistor 365 is connected to the first lead of a resistor 368. The second lead of the resistor 368 is connected to the common lead 200.

The inductive pick-up coil 310 is connected to the inductive pick-up coil 315 and to the junction between the second lead of the resistor 365 and the first lead of a resistor 368. The inductive pick-up coil 315 is connected to the inductive pick-up coil 310 and to a current-carrying base electrode b1 via resistor 370, while transzorb 375 is connected between the common lead 200 and the junction between resistor 370 and base electrode b1.

Collector electrodes c1 and c2 are connected to the junction between the Zener diode 345 and the resistor 340. Emitter electrode e1 is connected to a current-carrying base electrode b2 via resistor 380, as well as to a current-carrying base electrode b3 via diodes 383, 385 and a resistor 387. A resistor 389 is connected between the common lead 200 and the junction between diode 385 and the resistor 387. An emitter e2 is connected to an emitter e3, and a capacitor 390 is connected between positive connection lead 350 and the junction between the emitter e2 and the emitter e3. Collector c3 is connected to the common lead 200.

Figure 4:
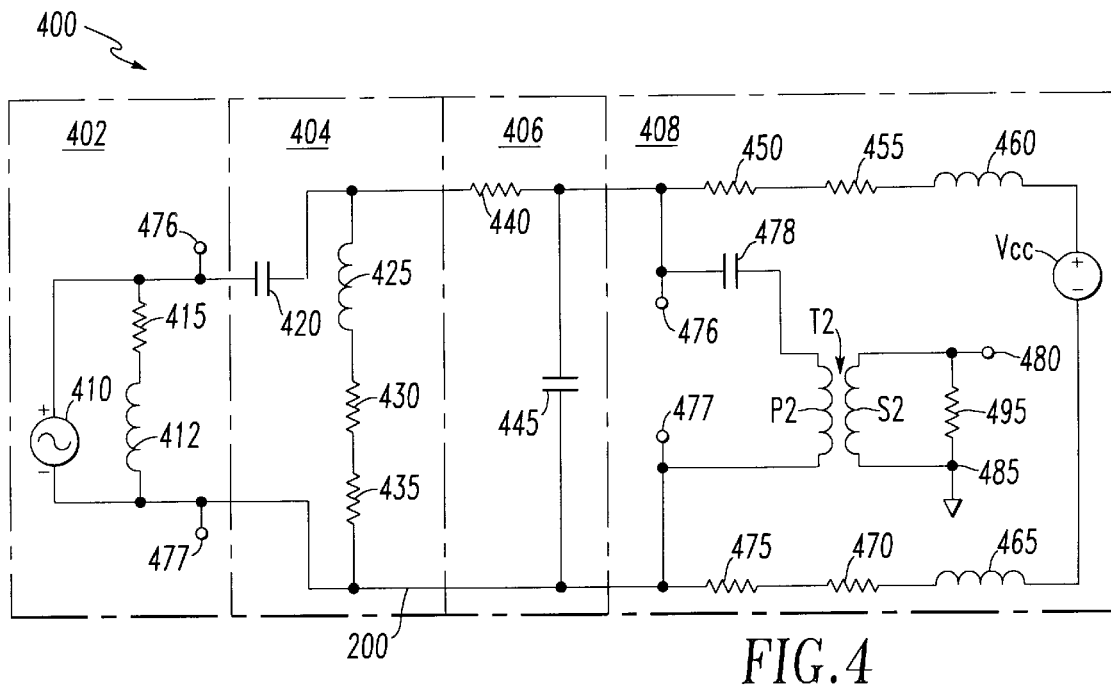
FIG. 4 is a circuit diagram showing a preferred embodiment of a passive nonamplified circuit model of the remote circuit and the local circuit and the interconnecting cable, in accordance with an alternate preferred embodiment of the present invention.

FIG. 4 is a circuit diagram showing a preferred embodiment of a passive nonamplified circuit model 400 in accordance with an alternate preferred embodiment of the present invention. As shown, the circuit model 400 includes a pick-up coils section 402, an interface section 404, a cabling section 406 and a termination section 408.

The pick-up coils section 402 includes a current source 410 that models the current that is picked-up by the inductive pickup coils 310, 315 of FIG. 2, which coils are modeled by an inductor 412 (measuring 43 mH in a preferred embodiment) connected across the current source 405 via resistor 415 (preferably about 100Ω). The interface section 404 includes a decoupling capacitor 420 (measuring 1 μF in a preferred embodiment) connected to the junction between the resistor 415 and the positive terminal of the current source 410, and to the upper end of an inductor 425 (preferably measuring about 120 mH). The lower end of the inductor 425 is connected to the common lead 200 via DC bias coil resistance 430 (preferably about 177Ω) and DC resistor 435 (about 909Ω) connected in series.

The interface section 406 is a circuit representation of interconnecting means 130 of FIG. 1, including a resistance 440 (representing a total resistance of cabling and couplers, approximately 6.3Ω) connected to the junction between the decoupling capacitor 420 and the DC bias coil inductance 425, as well as connected to the common lead 200 via capacitance 445 (representing a total capacitance of cabling and couplers, approximately 0.018 μF). The resistance 440 and capacitance 445 may be varied to represent changing the length and wire characteristics, with wide varying results (i.e. 3 to 1) in signal loss.

The termination section 408 is analogous to the local circuit 120 (see FIG. 1) and includes a series connection of a DC bias resistor 450 (preferably about 110Ω) and a resistance 455 (representing a DC bias coil resistance, about 177Ω) and an inductor 460 (representing a DC bias coil inductance, preferably about 120 mH) to the junction between the resistance 440 and the capacitance 445, and to the positive terminal of a voltage source Vcc. A preferred embodiment of the voltage source Vcc is a battery with a voltage ranging between 25–42 vdc, nominally 37.5 vdc. Further, an inductance 465 and a resistance 470 and a DC bias resistor 475 (preferably about 110Ω) are connected in series to the negative terminal of the voltage source Vcc and to the common lead 200. The inductance 465 represents a DC bias coil inductance, preferably about 120 mH. The resistance 470 represents a DC bias coil resistance, preferably about 177Ω. A positive pick-up coil input lead 476 may be provided at the junction between the resistors 440, 450; and a negative pick-up coil input lead 477 may be connected to the common lead 200. Further, the upper end of a primary winding P2 of an isolation transformer T2 is connected via a decoupling capacitor 478 (preferably 1 μF) to the junction between the resistance 440 and the resistor 450, while the lower end of the primary winding P2 is connected to the common lead 200. The transformer T2 may have a 1:1 turns ratio and similar characteristics as the transformer T1 of FIG. 2. The upper and lower ends of a secondary winding S2 provide a first output lead 480 and a second output lead 485, respectively. A resistor 490, which represents an input resistance (preferably about 10 kΩ), of a well-known Frequency Shift Key PCB (printed circuit board) amplifier (not shown), is connected between the first output lead 480 and the second output lead 485.

2. Operation of the Preferred Embodiment

In operation, the local circuit 120 of FIG. 2 may be located at the processing equipment that needs to use the signal output of the remote sensor of the remote circuit 110. The two-wire interconnection means 130, typically a shielded twisted-pair cable, interconnects the remote and local circuits by connecting a first conducting path (such as a wire, not shown) between the positive connection leads 350 and 235, and by connecting a second conducting path (such as a wire, not shown) between the common lead 200 of each of FIGS. 2 and 3, thereby forming an electrical path between each of the positive connection leads 350 and 235, and between each of the negative connection leads 351 and 236 that are connected to the common lead 200 of each of FIGS. 3 and 2, respectively.

The local circuit 120 sources a specified DC battery (i.e. a bias source, such as the DC source 205) and current levels to the remote circuit 110, and provides an AC signal path to extract (for processing purposes) the signal transmitted back from the remote circuit and sensor. The signal that transmits through the interconnecting twisted-pair cable is a combination of the DC battery level and the remote AC signal that is sensed by the remote pick-up coils 310,315. Resistors 220 and 225 of the local circuit 120 may be adjustable or selectable, such that their resistance may be chosen to provide a predetermined minimum current level in the remote circuit 110, and also a sufficient potential in the remote circuit 110 to permit the Zener diode 345 to operationally regulate in a known Zener mode at −40° F. The object is for the remote circuit 110 to provide an AC carrier output signal to be transmitted on a first conducting path (i.e., the battery line, not shown) of the interconnecting means 130 connected between the positive connection lead 350 and the positive connection lead 235. The inductor 330, which is connected to the positive connection lead 350, will be high impedance to the AC signal, thereby preventing AC ripple The capacitor 250 decouples and isolates the DC signal from the AC carrier output signal that is transmitted from the positive connection lead 350 of the remote circuit 110 to the positive connection lead 235 of the local circuit 120. The transformer T1 isolates the output terminals 260,265 from the ground reference (i.e. common lead 200) from the rest of the external circuitry (not shown). The inductor 210 and the capacitors 240, 245 filter the DC battery source 205, and the inductor 210 places an apparent high impedance between the battery 205 and the AC signal being transmitted through the interconnecting means 130 from the remote circuit. The bi-directional transzorb 255 protects the processing equipment input (not shown) from extraneous voltage transients that may be picked up by the interconnecting means 130, such as the interconnecting cable. The diode 230 protects the remote circuitry from the DC source 205 that may be erroneously connected backwards. The unipolar DC power source 205 must be chosen to be of a sufficient potential to overcome the DC voltage/current requirements for maintaining electrical contact integrity.

The remote circuit 110 was developed to transmit low level inductive sensor signals undistorted and without voltage gain to the local circuit 120, which may be located as much as hundreds of feet away. Sensor types other than the inductive pick-up coils 310, 315 that produce an AC type signal are contemplated for use within the scope of the present invention. The Zener diode 345 regulates the power supply voltage for the unity gain amplifier 300 formed by Q1, Q2, and Q3. By design, the value of the Zener voltage was determined to be several volts above the minimum critical voltage that is required to maintain contact integrity. The remote location of the DC source 205 requires that the power souenhancethe amplifier be regulated. Regulation of the power source also enhances circuit operation over the complete temperature range for the circuits.

Base resistors 370, 380 and 387 are included to prevent spurious high-frequency oscillations. The unidirectional Transzorb 375 protects the input stage of the amplifier from voltage transients that may be introduced either from the interconnecting means 130 or from the remote pick-up coils 310, 315. The DC offset level at the emitters of Q2 & Q3 is determined by the ratio of resistor 365 to resistor 370 at the potential regulated by the Zener diode 345, and minus the base-emitter junction potentials of transistors Q1 & Q2. The sensed AC sensor signal is referenced to this offset, and therefore has a maximum allowable peak-to-peak amplitude of the Zener diode 345 value, with positive and negative excursion limits defined by the offset. The DC source 205 at the remotely-located local circuit 120 must be chosen to supply the voltage of Zener diode 345, plus all of the voltage drops generated by the interconnecting means 130, plus voltage drops across the inductor 210, the resistors 215, 220, 225, and the diode 230 in the local circuit 120. The output signal generated at the emitters e2, e3 of transistors Q2 and Q3 is capacitively AC coupled to the positive connection lead 350 at the interconnecting means 130 by the capacitor 390. The reactance at audio frequencies of inductor 330 is very high, which substantially reduces the AC signal on the power source side of the amplifier 300. On the other hand, the AC signal transmitted to the local circuit 120 via interconnecting means 130 will be relatively unimpeded. As described, the second conducting path of the interconnecting means 130 interconnects the common lead 200 of each of FIGS. 2 and 3, thereby forming the ground reference for both circuits.

An alternate preferred embodiment is shown in FIG. 4. The more complex and costly remote circuit 110 with the active amplifier 300 compensates for impedance mismatching that may occur if the signal path conductor length is unknown and variable. However, if the signal path conductor length is known and fixed between the local circuit 120 and the remove circuit 110, such that significant variations of voltage drop and impedance characteristics are not of concern, then the present invention may be implemented without a remote amplifier. This alternative embodiment still overcomes the problems of poor contacts, and is less complex, more compact, lower cost, and has somewhat better long-term reliability than the embodiment that utilizes the active amplifier 300 within the remote circuit 110.

The pick-up coils section 402 in combination with the interface section 404 models a passive non-amplified circuit which is analogous to the active remote circuit 110 of FIG. 3, but without the active unity gain amplifier element 300.

The capacitor 420 is analogous to the capacitor 391 of FIG. 3, and the inductor 425 with the resistors 430, 435 are analogous to the inductor 330 with the resistors 335, 340 and the active unity gain amplifier element 300 of FIG. 3, thereby to model the active circuit of FIG. 3 as the passive non-amplified circuit of FIG. 4. The pick-up coils section 402 in combination with the interface section 404 models a passive non-amplified circuit which is analogous to the active remote circuit 110 of FIG. 3, but without the active unity gain amplifier element 300.

The active circuit of FIG. 3 is more complex and costly but compensates for impedance mismatching, whereas the passive non-amplified circuit of FIG. 4 is useful if the length between the local circuit 120 and the remote circuit 110 (see FIG. 1) is known and fixed.

The foregoing description is included to illustrate the operation of the preferred embodiment and is not meant to limit the scope of the invention. From the foregoing description, many variations will be apparent to those skilled in the art that would yet be encompassed by the spirit and scope of the invention. For instance, although preferred embodiments of the invention have been described in conjunction with an interconnecting twisted-pair cable, it will be understood that the principles of the invention may be extended to other two wire interconnections that may be known in the art. Further, although preferred embodiments of the invention have been described in conjunction with inductive pick-up coils 310, 315, it will be understood that the principles of the invention may be extended to other means for sensing an AC signal than those described hereinabove.

The preferred embodiment was chosen and described in order to best explain the principles of the present invention and its practical applications to those skilled in the art, and thereby to enable those persons skilled in the art to best utilize the present invention in various embodiments and with various modifications as are suited to the particular use contemplated. It is intended that the scope of the present invention be broadly defined by the claims, which follow.

What is claimed is:

1. A signal transmitter for transmitting an alternating current (AC) signal through an electrical contact, wherein the electrical contact has a minimum voltage rating and a minimum current rating that respectively exceeds a voltage level and a current level of the AC signal, the signal transmitter comprising:

remote circuit means for sensing the AC signal;

a direct current (DC) power source;

local circuit means for biasing the AC signal with said DC power source;

interconnection means having solely two conductive paths for electrically interconnecting said remote circuit means with said local circuit means;

wherein a biased AC signal is formed by adding a DC signal bias that is provided by said DC power source to said sensed AC signal at said remote circuit means, thereby to exceed the minimum voltage and current rating of the electrical contact; and wherein said DC signal bias is removed from said sensed AC signal at said local circuit means after being transmitted through the electrical contact via said interconnection means.

2. The signal transmitter according to claim 1, wherein said biased AC signal is transmitted from said remote circuit means to said local circuit means through the electrical contact and said interconnecting means.

3. The signal transmitter according to claim 2, wherein said DC power source powers both of said remote and local circuit means from said local circuit means and through said interconnecting means.

4. The signal transmitter according to claim 2, wherein said DC power source powers both of said remote and local circuit means from said remote circuit means and through said interconnecting means.

5. The signal transmitter according to claim 1, wherein said remote circuit means further comprises:

a pick-up coil system for inductively receiving the AC signal.

6. A signal transmitter for transmitting an alternating current (AC) signal through an electrical contact, wherein the electrical contact has a minimum voltage rating and a minimum current rating that respectively exceeds a voltage level and a current level of the AC signal, the signal transmitter comprising:

remote circuit means for sensing the AC signal, said remote circuit means comprising current amplifying means for amplifying the AC signal with zero DC bias, wherein said current amplifying means has unity gain, thereby to retain pre-determined railroad vitality requirements;

a direct current (DC) power source;

local circuit means for biasing the AC signal with said DC power source;

interconnection means having solely two conductive paths for electrically interconnecting said remote circuit means with said local circuit means;

wherein a biased AC signal is formed by adding a DC signal bias that is provided by said DC power source to said sensed AC signal at said remote circuit means, thereby to exceed the minimum voltage and current rating of the electrical contact; and wherein said DC signal bias is removed from said sensed AC signal at said local circuit means after being transmitted through the electrical contact via said interconnection means.

7. The signal transmitter according to claim 6, wherein said interconnection means further comprises a cable having a first and a second electrical conduction path.

8. The signal transmitter according to claim 7, wherein said cable is a shielded twisted-pair cable.

9. The signal transmitter according to claim 6, wherein said local circuit means further comprises:

inductance means for filtering said DC power source, wherein said inductance means places an apparent high impedance between said DC power source and said biased AC signal that has been transmitted from said remote circuit means to said local circuit means.

10. A method of transmitting an alternating current (AC) signal from a remote location to a local location through an electrical contact, wherein the electrical contact has a minimum voltage rating and a minimum current rating that respectively exceeds a voltage level and a current level of the AC signal, wherein the method comprises the steps of:

a) sensing the AC signal from a rail of a railroad track;

b) amplifying the sensed AC signal with an amplifier having unity gain, thereby to retain pre-determined railroad vitality;

c) transmitting a DC bias signal through interconnection means for interconnecting the remote location and the local location through the electrical contact;

d) offsetting the AC signal with the DC bias signal such that the voltage level and the current level of the AC signal, when offset with the DC bias signal, respectively exceeds the minimum voltage rating and the minimum current rating of the electrical contact;

e) transmitting the AC signal that is offset with the DC bias signal to the local location through the electrical contact and said interconnection means;

f) removing the DC bias signal from the AC signal at the local location to provide an output AC signal with zero DC bias; and g) outputting said output AC signal with zero DC bias at the local location as a representation of the sensed AC signal that was sensed at the remote location.

11. An electronic circuit for transmitting an alternating current (AC) signal through an electrical contact, wherein the electrical contact has a minimum voltage rating and a minimum current rating that respectively exceeds a voltage level and a current level of the AC signal, the electronic circuit comprising:

a remote circuit that senses the AC signal;

a local circuit that outputs the AC signal;

a cable having solely two conductive paths for electrically interconnecting said remote circuit with said local circuit at the electrical contact;

a direct current (DC) power source that powers said remote circuit and said local circuit when said cable electrically interconnects said remote and local circuits;

wherein said DC power source provides a DC signal bias that is added to said sensed AC signal at said remote circuit, thereby to exceed the minimum voltage and current rating of the electrical contact; and wherein said DC signal bias is removed from said sensed AC signal at said local circuit after being transmitted through the electrical contact via said cable.

12. The electronic circuit according to claim 11, wherein said remote circuit means further comprises:

a pick-up coil system for inductively receiving the AC signal.

13. An electronic circuit for transmitting an alternating current (AC) signal through an electrical contact, wherein the electrical contact has a minimum voltage rating and a minimum current rating that respectively exceeds a voltage level and a current level of the AC signal, the electronic circuit comprising:

a remote circuit that senses the AC signal, said remote circuit comprising current amplifying means for amplifying the AC signal with zero DC bias, wherein said current amplifying means has unity gain, thereby to retain pre-determined railroad vitality requirements;

a local circuit that outputs the AC signal;

a cable having solely two conductive paths for electrically interconnecting said remote circuit with said local circuit at the electrical contact;

a direct current (DC) power source that powers said remote circuit and said local circuit when said cable electrically interconnects said remote and local circuits;

wherein said DC power source provides a DC signal bias that is added to said sensed AC signal at said remote circuit, thereby to exceed the minimum voltage and current rating of the electrical contact; and wherein said DC signal bias is removed from said sensed AC signal at said local circuit after being transmitted through the electrical contact via said cable.

* * * * *

UNITED STATES PATENT AND TRADEMARK OFFICE
CERTIFICATE OF CORRECTION

PATENT NO. : 6,052,050  Page 1 of 1
DATED : April 18, 2000
INVENTOR(S) : Michael E. Colbaugh et al.

It is certified that error appears in the above-identified patent and that said Letters Patent is hereby corrected as shown below:

Column 1,
Line 9, remove "to".

Column 3,
Line 54, "11 0" should read -- 110 --.

Column 5,
Line 17, "100Ω" should read -- 10Ω --.

Column 7,
Line 5, "souenhancethe" should read -- source of the --.

Signed and Sealed this

Twenty-fifth Day of December, 2001

Attest:

JAMES E. ROGAN
Attesting Officer   Director of the United States Patent and Trademark Office